United States Patent [19]

Tanaka et al.

[11] Patent Number: 5,056,937
[45] Date of Patent: Oct. 15, 1991

[54] SLIDING BEARING

[75] Inventors: Tadashi Tanaka, Konan; Masaaki Sakamoto, Nagoya; Motomu Wada, Owariasahi; Hideyuki Kidokoro, Komaki; Yoji Nagai, Nagoya, all of Japan

[73] Assignee: Daido Metal Company Ltd., Nagoya, Japan

[21] Appl. No.: 622,022

[22] Filed: Dec. 4, 1990

[30] Foreign Application Priority Data

Dec. 5, 1989 [JP] Japan .................. 1-315603

[51] Int. Cl.$^5$ ............................................. F16C 33/12
[52] U.S. Cl. ..................................... 384/278; 384/294
[58] Field of Search ............... 384/278, 276, 625, 912, 384/294, 288

[56] References Cited

U.S. PATENT DOCUMENTS 3,249,391  5/1966  DeHart et al. .............. 384/294
3,361,502  1/1968  Weinkamer et al. ......... 384/294
4,553,856  11/1985 Bierlein et al. .............. 384/294
4,836,695  6/1989  Baureis et al. .............. 384/294

Primary Examiner—Lenard A. Footland
Attorney, Agent, or Firm—Browdy and Neimark

[57] ABSTRACT

A sliding bearing such as a half sliding bearing, a cylindrical bushing and etc. includes a back metal of a three-layer construction composed of a back metal portion of austenitic stainless steel having a thermal expansion coefficient of not less than $15 \times 10^{-6}/°C.$, a plated bonding layer formed on the back metal portion, and a plating layer of Cu or a Cu alloy formed on the bonding layer. An alloy layer made of a copper-lead alloy or a lead-bronze alloy is formed on the back metal. With this construction, the alloy layer is positively bonded to the back metal. The austenitic stainless steel is of such a type that the back metal is less subjected to work hardening, and the austenitic stainless steel contains those components which prevent work-inducing martensite transformation.

3 Claims, 1 Drawing Sheet

SLIDING BEARING

BACKGROUND OF THE INVENTION

This invention relates generally to a sliding bearing having a back metal made of austenitic stainless steel, and more particularly to a sliding bearing which has a high strength and a high thermal expansion coefficient, and provides an effective countermeasure against the reduction of interference portions of the bearing which reduction results from a thin wall structure of the bearing and a light-alloy design of a bearing housing.

The interference portions are parts of the bearing, and are necessary for press-fixing the bearing to a casing. More specifically, in the case of a half sliding bearing A, the bearing A, before assembled together, project slightly from halves of the casing B, respectively, as shown by "C" in FIG. 2A. The thus projected portions C are referred to as the interference portions. When the bearing A is in its assembled condition, the bearing A is subjected to compression corresponding to the amount of the interference portions C, as shown in FIG. 2B, and in this condition the bearing A is press-fixed to the casing B, and assumes a true cylindrical shape. For measuring the amount of the interference portions C, there is prepared a model having a diameter identical to the inner diameter of the casing B, and each half of the bearing A is press-fitted in the inner surface of the model under a predetermined pressure. The length of projecting of the half sliding bearing from the model is measured, and the value of measured projected length is defined to be the amount of the interference portion.

A conventional sliding bearing comprises a back metal of low-carbon steel, and a bearing alloy bonded to back metal. A bearing housing is also made of low-carbon steel. Therefore, the back metal and the housing are analogous in thermal expansion coefficient to each other, and even when the temperature rises during the operation of the bearing, the bearing and the housing are held in intimate contact with each other, with no gap developing therebetween. Thus, there has been no particular problem.

With respect to a big end bearing and a main bearing for an internal combustion engine, in order that a half sliding bearing can be held in intimate contact with a bearing housing, the bearing is assembled with a large interference. Particularly, recently, the bearing housing has increasingly been made of a light alloy to meet a lightweight design cf the engine. In this case, in a high-temperature condition, the housing of an aluminum alloy (thermal expansion coefficient: $20 \times 10^{-6}/°$ C.) expands to a greater extent than the back metal of low-carbon steel (thermal rexpansion coefficient; $13.5 \times 10^{-6}/°$ C.), so that the interference of the bearing is reduced. Therefore, the bearing can not follow the deformation of the housing caused by a temperature rise during a high-speed operation, and as a result a gap develops between the two. In order to avoid this difficulty, a greater interference is required; however, the resiliency of the low-carbon steel back metal and the rigidity of the housing are limited, and this results in a problem that the lightweight design can not be achieved easily.

SUMMARY OF THE INVENTION

It is therefore an object of this invention to provide a sliding bearing which overcomes the above problem of the prior art.

According to the present invention, there is provided a sliding bearing such as a half sliding bearing and a cylindrical bushing, comprising:

a back metal of a three-layer construction composed of a back metal portion of austenitic stainless steel having a thermal expansion coefficient of not less than $15 \times 10^{-6}/°$ C., a plated bonding layer formed on the back metal portion and having a thickness of 0.05 to 5 $\mu$m, and a plating layer of Cu or a Cu alloy for the bonding layer and having a thickness of 1 to 20 $\mu$m; and an alloy layer made of a copper-lead alloy or a lead-bronze alloy formed on the back metal and having a thickness of 0.1 to 2 mm.

The inventor of the present invention has found that in order to overcome the above problems, it is effective to use austenitic stainless steel (thermal expansion coefficient: $17.5 \times 10^{-6}/°$ C.), having a high strength and a high thermal expansion coefficient, as the back metal. During the operation of an internal combustion engine, the temperature of the bearing portion becomes high (150° to 200° C.), and the back metal is expanded, and can follow the deformation of a housing. Therefore, a large interference is not necessary when assembling the bearing, and the back metal can follow the expansion of the housing due to the heat during the operation. Since the back metal has a high strength, the back metal has an increased resistance to fretting, and the fatigue strength of the alloy is also increased. Therefore, the housing for a big end bearing and a main bearing can be lightweight.

However, since the surface of stainless steel is covered with a thin and strong oxide film, it is difficult to provide a good bonding between the stainless steel and the bearing alloy. Further, the stainless steel is subjected to a work-induced martensite transformation by the rolling of a bimetal prior to or after sintering process, so that the stainless steel undergoes work hardening, thus making the working or machining difficult.

In the present invention, in order to overcome the above difficulty, when the sintered bimetal of a copper-lead alloy or a lead-bronze alloy having the back metal of austenitic stainless steel is to be produced, Cu is plated on the stainless steel so as to achieve a more positive bonding, and then the copper-lead alloy or the lead-bronze alloy is sintered. The surface of the stainless steel is covered with a thin and strong oxide film. In the present invention, in order to remove this oxide film, Co or Ni is added to hydrochloric acid, and then a cathodic electrolysis is carried out so as to form the bonding layer of Co or Ni, and then the Cu plating is carried out. Thereafter, an ordinary sintering (which is similar to a sintering provided on a Cu-plated low-carbon steel) is carried out to produce the sintered bimetal having good bonding characteristics.

In the present invention, in order to minimize the work-hardening occurring due to the rolling, the austenitic stainless steel containing 10.5 to 16% of Ni and 0.5 to 4% of Mn is used. Ni and Mn prevent the work-induced martensite transformation. Therefore, the bimetal does not undergo much work-hardening by the rolling of the bimetal prior to or after sintering process and therefore when the bimetal is to be formed into a half sliding bearing or a bushing, the pressing and cutting of the bimetal can be easily carried out.

In the bearing of the present invention, the back metal is made of austenitic stainless steel, and this back metal has a high thermal expansion coefficient, and expands due to a temperature rise during the operation, so that the back metal can follow the expansion of the light-alloy housing. Therefore, large interference is not needed when assembling the bearing, and the bearing can be held in more intimate contact with the housing during the operation, and the bearing will not vibrate even during a high-speed rotation, thus enhancing the fatigue strength of the bearing.

However, since the surface of the austenitic stainless steel is covered with a thin and strong oxide film, it is impossible to bond the bearing alloy directly thereto. Therefore, Co or Ni is added to a hydrochloric acid, and then a cathode electrolysis is carried out so as to form the bonding layer of Co or Ni on this stainless steel. The lower limit of the thickness of this bonding layer is 0.05 $\mu$m to ensure that the Co or the Ni can form a stable film and that a positive bonding can be achieved. The upper limit of the bonding layer is 5 $\mu$m for economical reasons. Cu is easily plated on this bonding layer. The copper-lead alloy or the lead-bronze alloy is sintered on this Cu-plating layer, and by doing so, there can be obtained a positive bonding as achieved in a conventional sintering provided on a Cu-plated low-carbon steel.

The lower limit of the thickness of the Cu-plating layer is 1 $\mu$m so as to achieve a positive bonding, and the upper limit of this thickness is 20 $\mu$m for economical reasons.

The bonding layer is made of Co, Ni or an alloy thereof. Co—Cu is less liable to diffusion than Ni—Cu, and achieves an excellent bonding. Preferably, Co and an alloy thereof are used.

In the process for producing the bimetal, the rolling is carried out in order to prevent pores from developing during the sintering and also for the purpose of the sizing. Austenitic stainless steel is subjected to work-induced martensite transformation by the rolling, so that this steel is greatly increased in hardness. The bimetal is subjected to a pressing operation and a cutting operation when the bimetal is worked into the bearing; however, it is difficult to work such steel, and the resultant tool has a short lifetime, and is uneconomical. Therefore, in the present invention, there is used the austenitic stainless steel containing 10.5 to 16% of Ni and 0.5 to 4% of Mn. Ni and Mn serve to stabilize the austenite and to prevent work-induced martensite transformation from developing during the working. The lower limit of the Ni content is 10.5% so as to stabilize the austenite, and its upper limit is 16% for economical reasons. The lower limit of the Mn content is 0.5% so as to stabilize the austenite, and its upper limit is 4% since an unduly increased amount of Mn makes the steel brittle.

Thus, in the present invention, there are achieved advantages that the hardening of the back metal is minimized, and that the working or machining of the sliding bearing is facilitated.

DETAILED DESCRIPTION OF THE EMBODIMENT OF THE INVENTION

Figure 1:
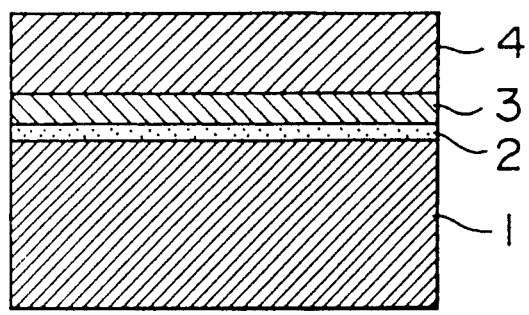
FIG. 1 is a vertical cross-sectional view of a sliding bearing provided in accordance with the present invention.
Figure 2A:
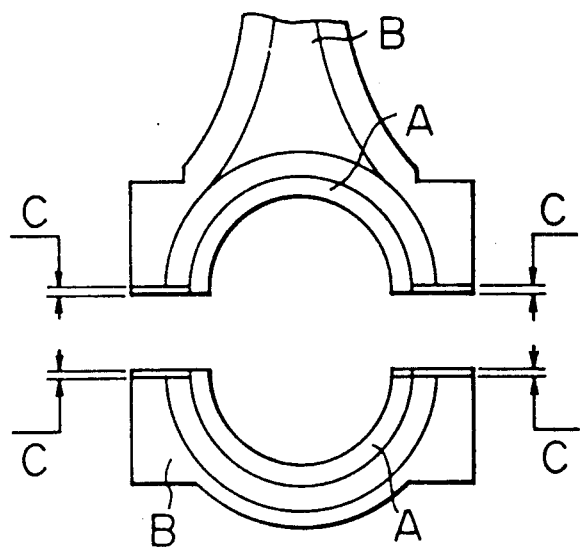
FIGS. 2A and 2B are views showing the manner of fixing the bearing to a casing.
Figure 2B:
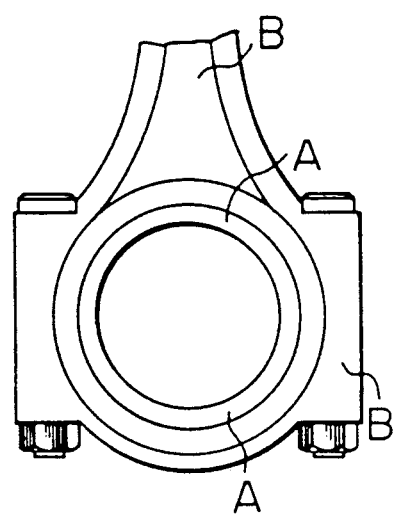

The present invention will now be illustrated by way of the following Example in which a bearing shown in FIG. 1 was produced, the bearing comprising a back metal 1, a bonding layer 2, a Cu-plating layer 3, and a bearing alloy layer 4.

EXAMPLE

A back metal of austenitic stainless steel (SUS316L) having a thickness of 1.2 mm was degreased, and then was introduced into an hydrochloric acid (concentration: 100 ml/l) to which cobalt chloride was added at a rate of 200 g/l. Then, a cathode electrolysis was carried out to effect an activation treatment, and a bonding layer of Co having a thickness of 2 $\mu$m was formed on the back metal. Then, a Cu layer having a thickness of 10 $\mu$m was formed on the bonding layer by plating. Here, the term "cathode electrolysis" means one in which the electrolysis is carried out using the back metal as a cathode. The cathode current density was 5 A/dm$^2$, and the temperature of the electrolyte was 25° C., and the electrolysis time was 3 minutes. The Cu plating was an ordinary copper cyanide plating, and the plating solution contained copper cyanide (70 g/l) and free potassium cyanide (18 g/l). The cathode current density was 6 A/dm$^2$, and the temperature of the plating solution was 70° C., and the plating time was 8 minutes.

Then, copper-lead alloy (Cu-25% Pb) powder having a particle size of −100 mesh was sintered on the back metal to produce a bimetal having a thickness of 1.6 mm. This alloy powder was sintered on the same conditions as used for a sintering on a conventional Cu-plated low carbon steel back metal. More specifically, a primary sintering (temperature: 820° C.), a primary rolling (rolling rate: 1%), a secondary sintering (temperature: 820° C.) and a secondary rolling (rolling rate: 4%) were carried out to thereby produce the bimetal.

Physical properties of the thus produced bimetal are shown in Table 1. The shear strength of the bimetal of the present invention was generally the same as that of conventional (comparative) bimetals each having a sintered layer formed on a low-carbon steel back metal. The conventional bimetal using SUS304 as the back metal was greatly increased in hardness due to work-hardening; however, the bimetal of the present invention was not so increased in hardness, and could be easily worked or machined.

The bimetal was formed into a half sliding bearing by working or machining, and then an overlay was applied to it, and then the half sliding bearing was subjected to a bench test. With respect to the conventional products, the bearing back surface of the back metal was subjected to a serious fretting damage (which is such phenomenon that, as a result of insufficient interference, micro-vibrations occur between the metals at the bearing back surface or joint interface of the back metal, thereby repeatedly causing surface micro-oxidation and separation), and besides the fatigue of the alloy surface was great. This is due to the fact that the bearing had not sufficient interference relative to the lightweight housing, so that the bearing vibrated during a high-speed rotation, thus causing the damage. On the other hand, the product of the present invention was not subjected to any abnormality, and exhibited a good performance.

TABLE 1

| Name | Kind of back metal (back steel) | Thermal expansion coefficient (RT - 300° C.) | Shear strength (kg/mm$^2$) | Hardness Hv 10 |
| --- | --- | --- | --- | --- |
| Present invention | SUS316L | 17.5 × 10$^{-6}$/°C. | 13 | 180 |
| Conventional product 1 | SUS304 | 17.8 × 10$^{-6}$/°C. | 12.5 | 270 |
| Conventional product 2 | S15C | 13.5 × 10$^{-6}$/°C. | 11' | 150 |

In the present invention, the austenitic stainless steel is subjected to the activation treatment so as to remove a thin and strong oxide film on this steel, and then the bonding layer of Co or Ni is plated on the steel, and then the Cu plating is applied to the bonding layer, and finally the copper-lead alloy or the lead-bronze alloy is bonded to this Cu-plating layer by sintering. With this method, the positive bonding is achieved. Further, the back metal is made of the austenitic stainless steel minimizing the work hardening and containing 10.5 to 16% of Ni and 0.5 to 4% of Mn which elements (Ni and Mn) prevent the work-induced martensite transformation, and therefore the bimetal can be easily worked or machined. Further, the back metal has a high thermal expansion coefficient which is characteristic of the austenitic stainless steel, and therefore the back metal expands due to a temperature rise during the operation, and follows the expansion of the light-alloy housing. Therefore, no large interference is required when assembling the bearing, and the bearing is held in more intimate contact with the housing during the operation, and the bearing is not vibrated even during a high-speed rotation, thereby enhancing the fatigue strength of the bearing. More advantageous effects can be achieved particularly when large interference can not be obtained respect to the lightweight and low-rigidity housing. The present invention is not limited to the half sliding bearing, and also can be applied to a bushing. A conventional bushing is press-fitted into a housing with a large press-fitting interference; however, the bushing of the present invention can satisfactorily follow the low-rigidity housing into which the bushing can not be pressfitted with a large press-fitting interference because the housing greatly expands during a high-temperature operation. Therefore, the required press-fitting interference is small, and this enables a lightweight design of the housing.

What is claimed is:

1. A sliding bearing comprising:
    a back metal of a three-layer construction composed of a back metal portion of austenitic stainless steel having a thermal expansion coefficient of not less than 15×10$^{-6}$/° C., a plated bonding layer formed on said back metal portion and having a thickness of 0.05 to 5 μm, and a plating layer of Cu or a Cu alloy formed on said bonding layer and having a thickness of 1 to 20 μm; and
    an alloy layer made of a copper-lead alloy or a lead-bronze alloy formed on said back plate and having a thickness of 0.1 to 2 mm.

2. A sliding bearing according to claim 1, in which said plated bonding layer is made of one selected from the group consisting of Co, Ni and an alloy thereof.

3. A sliding bearing according to claim 1 in which said austenitic stainless steel constituting said back metal portion contains 10.5 to 16% of Ni and 0.5 to 4% of Mn, said Ni and said Mn preventing work-induced martensite transformation, and a work hardening of said austenitic stainless steel being small.

* * * * *